United States Patent
Ue (10) Patent No.: US 7,167,676 B2
(45) Date of Patent: Jan. 23, 2007

(54) BASE STATION DEVICE, MOBILE STATION DEVICE AND TRANSMISSION POWER CONTROLLING METHOD

(75) Inventor: Toyoki Ue, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 378 days.

(21) Appl. No.: 10/466,525

(22) PCT Filed: Nov. 22, 2001

(86) PCT No.: PCT/JP01/10208

§ 371 (c)(1),
(2), (4) Date: Jul. 17, 2003

(87) PCT Pub. No.: WO03/044988

PCT Pub. Date: May 30, 2003

(65) Prior Publication Data
US 2004/0062218 A1    Apr. 1, 2004

(51) Int. Cl.
H04B 7/185    (2006.01)
(52) U.S. Cl. .................. 455/13.4; 455/23; 370/335
(58) Field of Classification Search .............. 455/69, 455/522, 436, 456, 13.4, 23, 17; 370/522, 370/329, 335, 328, 310, 320
See application file for complete search history.

(56) References Cited

U.S. PATENT DOCUMENTS

2002/0003788 A1* 1/2002 Ohgoshi et al. ............ 370/335
2002/0131376 A1* 9/2002 Wheatley et al. ........... 370/328
2003/0118057 A1* 6/2003 Ushirokawa et al. ....... 370/522

FOREIGN PATENT DOCUMENTS

| | | |
|---|---|---|
| CN | 1297295 | 5/2001 |
| EP | 1091503 | 4/2001 |
| JP | 2000/022589 | 1/2000 |
| JP | 2000/049663 | 2/2000 |

OTHER PUBLICATIONS

International Search Report dated Feb. 26, 2002.
F. Kikushi, et al., "Performance of SIR-Based Transmit Power Control using Outer Loop in the Forward Link of DS-CDMA", IEICE, NTT Mobile Communications Network Inc., pp. 113-118, Feb. 1997.

* cited by examiner

Primary Examiner—Edward F. Urban
Assistant Examiner—Tu X. Nguyen
(74) Attorney, Agent, or Firm—Stevens, Davis, Miller & Mosher, LLP (57) ABSTRACT

A spreading code notification section 201 notifies each mobile station apparatus of a spreading code corresponding to a mobile station apparatus currently communicating, a separation section 212 separates information indicating an interference station detected from the results of spreading in each mobile station apparatus from a received signal, and a control section 213 decreases the transmission power of a signal to the interference station.

11 Claims, 10 Drawing Sheets

BASE STATION DEVICE, MOBILE STATION DEVICE AND TRANSMISSION POWER CONTROLLING METHOD

TECHNICAL FIELD

The present invention relates to a base station apparatus, mobile station apparatus, and transmission power control method.

BACKGROUND ART

In a mobile communication system using the CDMA method, transmission power control is carried out in order to solve the so-called near-far problem. Transmission power control is broadly divided into two kinds: open-loop and closed-loop. When closed-loop transmission power control is applied to downlinks (channels from a base station to mobile stations), the operation of mobile stations and the base station is as follows.

A mobile station measures the SIR (Signal to Interference Ratio) indicating the quality of a received signal, and compares this measured SIR with a target SIR. If the measured SIR is greater than the target SIR, the mobile station sends the base station an instruction to lower the transmission power, and if the measured SIR is less than or equal to the target SIR, the mobile station sends the base station an instruction to raise the transmission power. The base station increases or decreases transmission power in accordance with this instruction.

Thus, with closed-loop transmission power control performed on a downlink, a mobile station instructs the base station to raise or lower transmission power based on the amount of interference received by the mobile station.

With the CDMA method, a base station performs communication with a plurality of mobile stations at the same time in the same frequency band, and therefore an increase in transmission power for a particular mobile station causes an increase in the amount of interference for other stations. Also, a mobile station for which the amount of interference increases sends the base station an instruction to raise the transmission power in order to maintain reception quality. When the base station increases transmission power for the mobile station that transmitted the instruction, the amount of interference for other mobile stations increases.

When such a series of operations is repeated, transmission power for all mobile stations gradually increases, and the amount of interference for other mobile stations also gradually increases. When the amount of interference mutually imposed by mobile stations gradually increases in this way, it is possible that the mutually imposed amount of interference will increase to an impermissible extent. As a result, the number of mobile stations that a base station can accommodate in its cell will be drastically reduced. That is to say, system capacity will be drastically reduced.

DISCLOSURE OF INVENTION

It is an object of the present invention to provide a base station apparatus, mobile station apparatus, and transmission power control method that enable appropriate transmission power control to be carried out so that system capacity is not reduced.

The present inventors arrived at the present invention by noting that, in order to obtain the desired reception quality, when a mobile station receives interference, there is a method whereby the transmission power of the interference signal is decreased in addition to a method whereby the transmission power of the desired signal is increased, and by finding that decreasing the transmission power of a signal to a mobile station causing interference enables the desired reception quality to be obtained in each mobile station, and also reduces the amount of mutual interference between mobile stations, making it possible to prevent a reduction in system capacity.

Thus, the present invention does not make the amount of interference relatively smaller by increasing the transmission power of a signal to a mobile station that receives interference, but directly decreases the amount of interference by decreasing the transmission power of a signal to a mobile station causing interference.

BEST MODE FOR CARRYING OUT THE INVENTION

With reference now to the accompanying drawings, embodiments of the present invention will be explained in detail below.

(Embodiment 1)

Figure 1:
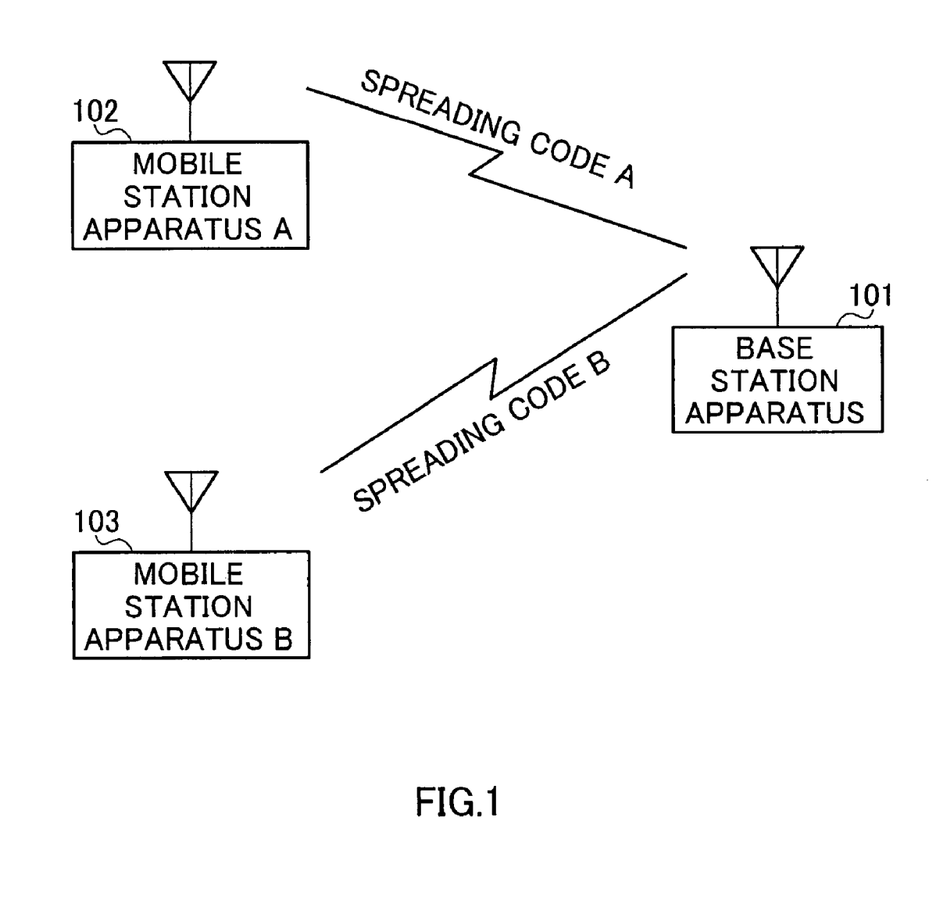
FIG. 1 is a conceptual diagram of a radio communication system in which a base station apparatus according to Embodiment 1 of the present invention and mobile station apparatuses according to Embodiment 1 of the present invention carry out communication.

FIG. 1 is a conceptual diagram of a radio communication system in which a base station apparatus according to Embodiment 1 of the present invention and mobile station apparatuses according to Embodiment 1 of the present invention carry out communication. In FIG. 1, a base station apparatus 101 is communicating with a mobile station apparatus A 102 and a mobile station apparatus B 103.

A spreading code A is assigned to mobile station apparatus A 102, and a spreading code B is assigned to mobile station apparatus B 103. That is to say, data transmitted and received between base station apparatus 101 and mobile station apparatus A 102 is spread with spreading code A, and data transmitted and received between base station apparatus 101 and mobile station apparatus B 103 is spread with spreading code B.

Figure 2:
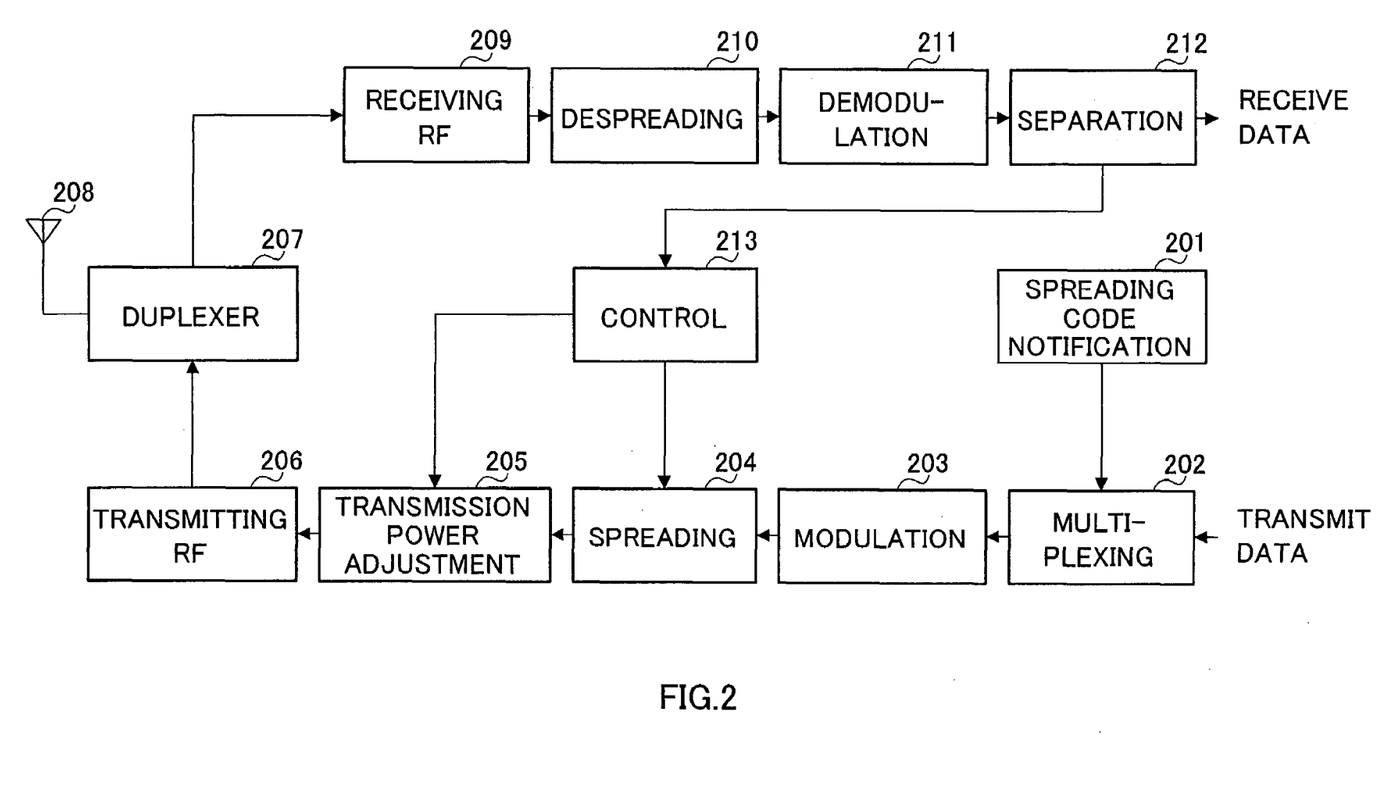
FIG. 2 is a main block diagram showing the configuration of a base station apparatus according to Embodiment 1 of the present invention.

The configuration of base station apparatus 101 will now be described. FIG. 2 is a main block diagram showing the configuration of a base station apparatus according to Embodiment 1 of the present invention. Base station apparatus 101 comprises a number of transmitting systems each composed of a multiplexing section 202 through transmission power adjustment section 205, and receiving systems each composed of a despreading section 210 through separation section 212, the number of these systems being equal to the number of mobile stations that can be accommodated in the cell of the base station. For convenience, only one of each system is shown here.

In FIG. 2, a spreading code notification section 201 sends to each mobile station apparatus information indicating the spreading code assigned to the mobile station apparatus currently being communicated with. Multiplexing section 202 multiplexes information indicating the spreading code with transmit data. A modulation section 203 performs predetermined modulation processing on the transmit data. A spreading section 204 spreads the transmit data with the spreading code assigned to that mobile station apparatus. Transmission power adjustment section 205 adjusts the transmission power of the transmit data. A transmitting RF section 206 performs predetermined radio processing such as frequency conversion on the transmit data. A duplexer 207 separates signals transmitted and received via an antenna 208 into transmission and reception signals.

A receiving RF section 209 performs predetermined radio processing such as frequency conversion on a received signal. Despreading section 210 despreads the received signal with the spreading code assigned to that mobile station apparatus. A demodulation section 211 performs predetermined demodulation processing on the received signal. Separation section 212 separates the demodulated signal into receive data and information (hereinafter referred to as "interference station information") indicating a mobile station apparatus (hereinafter referred to as "interference station") that is a cause of imposing interference on other mobile stations. A control section 213 controls the transmission power and transmission rate of transmit data to the interference station.

Figure 3:
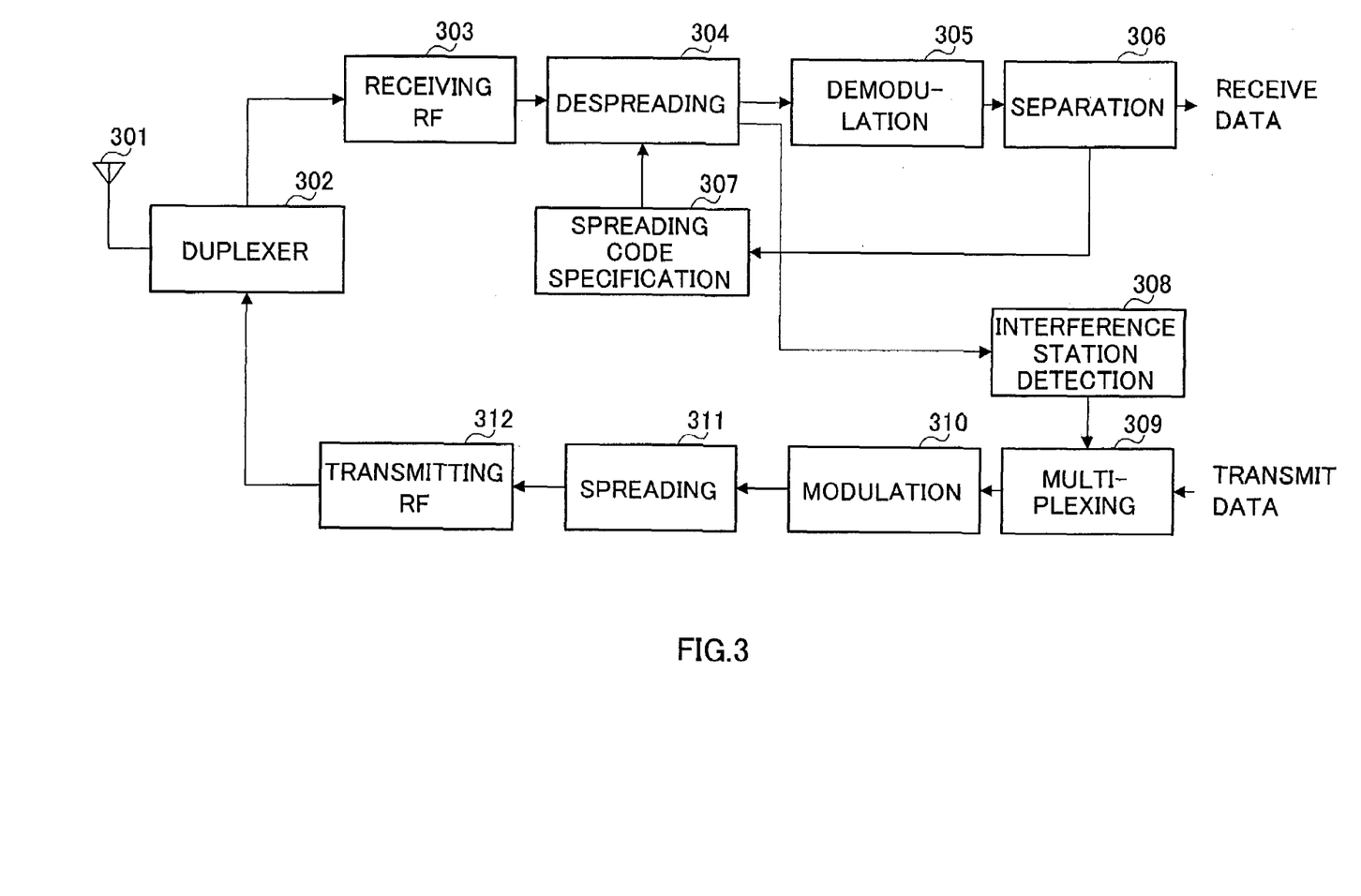
FIG. 3 is a main block diagram showing the configuration of a mobile station apparatus according to Embodiment 1 of the present invention.

The configuration of mobile station apparatus A 102 and mobile station apparatus B 103 will now be described. FIG. 3 is a main block diagram showing the configuration of a mobile station apparatus according to Embodiment 1 of the present invention. Mobile station apparatus A 102 and mobile station apparatus B 103 have the same configuration.

In FIG. 3, a duplexer 302 separates signals transmitted and received via an antenna 301 into transmission and reception signals. A receiving RF section 303 performs predetermined radio processing such as frequency conversion on a received signal. A despreading section 304 despreads the received signal with a spreading code assigned to the mobile station (A 102, B 103) and a despreading code assigned to another mobile station apparatus that is currently communicating with the base station apparatus (hereinafter referred to as "other station's spreading code"). A demodulation section 305 performs predetermined demodulation processing on the received signal. A separation section 306 separates the demodulated signal into receive data and information indicating the other station's spreading code. A spreading code specification section 307 specifies the other station's spreading code to despreading section 304.

From the results of despreading, an interference station detection section 308 detects another mobile station that is a cause of interference imposed on the mobile station (A 102, B 103), (that is, it detects an interference station). A multiplexing section 309 multiplexes interference station information with transmit data. A modulation section 310 performs predetermined modulation processing on the transmit data. A spreading section 311 spreads the transmit data with the spreading code assigned to the mobile station (A 102, B 103). A transmitting RF section 312 performs predetermined radio processing such as frequency conversion on the transmit data.

Next, the operation of a base station apparatus and mobile station apparatus with the above configurations will be described. First, in base station apparatus 101 shown in FIG. 2, spreading code notification section 201 outputs information indicating spreading code A and information indicating spreading code B to multiplexing section 202. That is to say, spreading code notification section 201 sends information indicating a mobile station apparatus that each mobile station apparatus should investigate as an interference station. In other words, spreading code notification section 201 sends to each mobile station apparatus information which indicates a potential interference station which has a possibility of interfering with the mobile station apparatus. As base station apparatus 101 sends information indicating a mobile station apparatus (here, a spreading code) to each mobile station apparatus, it is possible for other stations subject to investigation to be narrowed down by each mobile station apparatus, enabling the time necessary for interference station detection to be shortened.

In multiplexing section 202, information indicating spreading code A and information indicating spreading code B is multiplexed with the transmit data, and the data that has undergone multiplexing is output to modulation section 203.

The data in which information indicating spreading code A and information indicating spreading code B is multiplexed is subjected to predetermined modulation processing by modulation section 203, and is spread by spreading section 204. At this time, transmit data for mobile station apparatus A 102 is spread with spreading code A, and transmit data for mobile station apparatus B 103 is spread with spreading code B. After spreading, the transmit data has its transmission power adjusted by transmission power adjustment section 205. The transmission power adjustment method will be described later herein.

Transmit data whose transmission power has been adjusted is subjected to predetermined radio processing by transmitting RF section 206, and is then transmitted to each mobile station apparatus via duplexer 207 and antenna 208.

Next, in mobile station apparatus A 102 and mobile station apparatus B 103 shown in FIG. 3, a signal received via antenna 301 and duplexer 302 is subjected to predetermined radio processing by receiving RF section 303, and is output to despreading section 304.

In despreading section 304, the received signal is first despread with the spreading code assigned to the mobile station (A 102, B 103). That is to say, in mobile station apparatus A 102 the received signal is despread with spreading code A, and in mobile station apparatus B 103 the received signal is despread with spreading code B.

The despread signal is subjected to predetermined demodulation processing by demodulation section 305, and is output to separation section 306. In separation section 306, the demodulated signal is separated into receive data, information indicating spreading code A, and information indicating spreading code B. The information indicating spreading code A and information indicating spreading code B is then output to spreading code specification section 307.

In spreading code specification section 307, another station's spreading code is specified to despreading section 304 in accordance with the information indicating the above spreading codes. That is to say, in mobile station apparatus A 102, since the spreading code assigned to the mobile station apparatus A 102 is spreading code A, the other station's spreading code is determined to be the spreading code other than spreading code A-that is, spreading code B-and spreading code B is specified to despreading section 304 from spreading code specification section 307. Similarly, in mobile station apparatus B 103, spreading code A is specified to despreading section 304 from spreading code specification section 307.

Figure 4A:
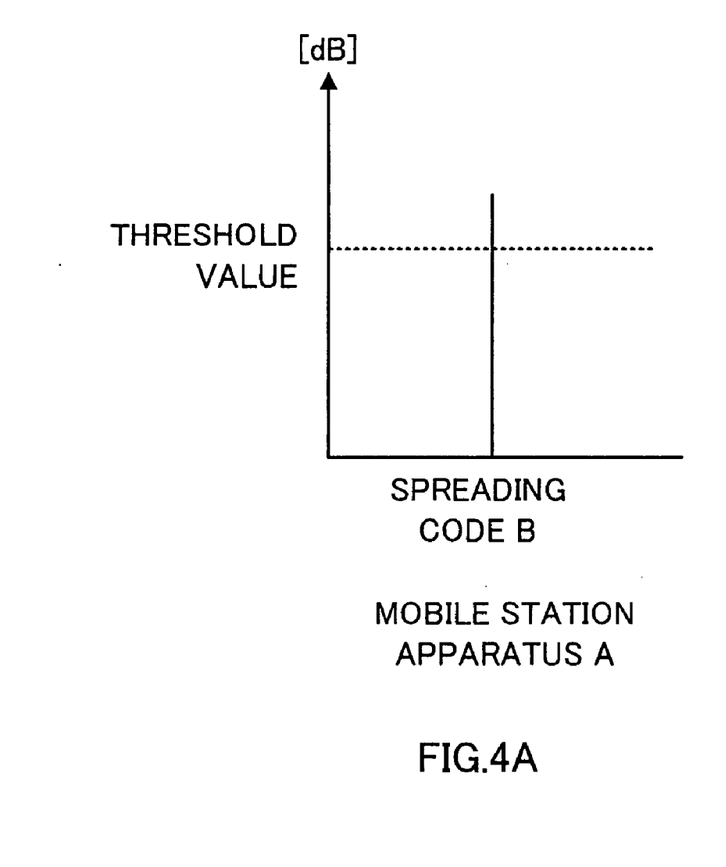
FIG. 4A is a drawing showing an example of the result of despreading by a mobile station apparatus according to Embodiment 1 of the present invention.
Figure 4B:
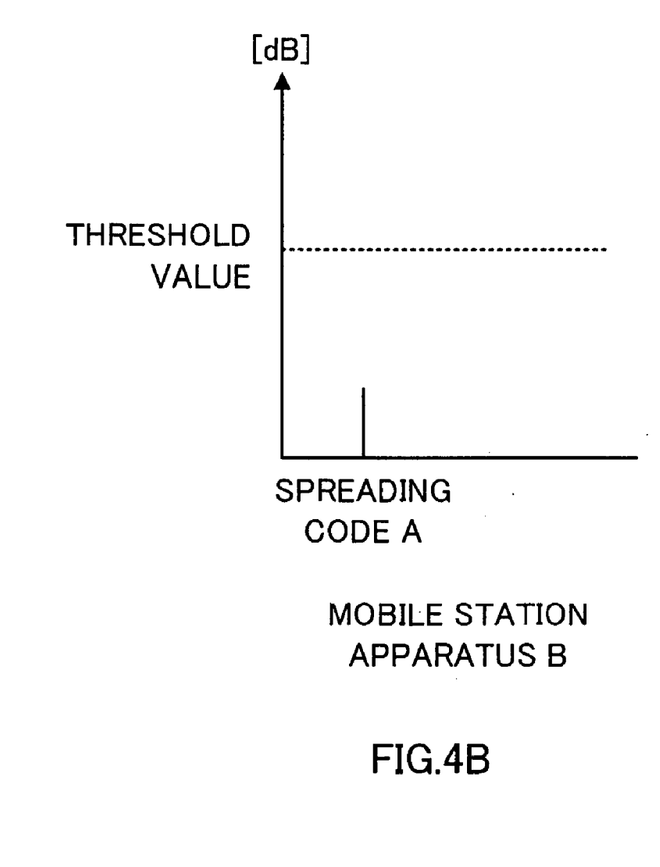
FIG. 4B is a drawing showing an example of the result of despreading by a mobile station apparatus according to Embodiment 1 of the present invention.

Next, in despreading section 304, the received signal is despread using the other station's spreading code. That is to say, in mobile station apparatus A 102 the received signal is despread with spreading code B, and in mobile station apparatus B 103 the received signal is despread with spreading code A. The despreading results (that is, correlation values) at this point are as shown in FIG. 4A and FIG. 4B, respectively. FIG. 4A and FIG. 4B are drawings showing examples of the results of despreading by a mobile station apparatus according to Embodiment 1 of the present invention.

At this point, as shown in FIG. 4A, in mobile station apparatus A 102 the correlation value between the received signal and spreading code B is greater than a predetermined threshold value, and as shown in FIG. 4B, in mobile station apparatus B 103 the correlation value between the received signal and spreading code A is less than the predetermined threshold value. These correlation values are output to interference station detection section 308.

In interference station detection section 308, the predetermined threshold value and the correlation values output from despreading section 304 are compared in terms of size, and a mobile station apparatus to which a spreading code whose correlation value is greater than or equal to the predetermined threshold value is assigned is detected as an interference station with respect to the mobile station (A 102, B 103).

That is to say, in mobile station apparatus A 102, since the size of the correlation value between the received signal and spreading code B exceeds the predetermined threshold value, as shown in FIG. 4A, mobile station apparatus B 103 is detected by interference station detection section 308 as an interference station with respect to the mobile station apparatus A 102. Information indicating mobile station apparatus B 103 is then output to multiplexing section 309 as interference station information, and multiplexed with transmit data.

In mobile station apparatus mobile station apparatus B 103, since the size of the correlation value between the received signal and spreading code A is smaller than the predetermined threshold value, as shown in FIG. 4B, mobile station apparatus A 102 is not detected as an interference station with respect to the mobile station apparatus B 103. Therefore, the following description will focus on data in which interference station information is multiplexed, transmitted from mobile station apparatus A 102.

The threshold value set for comparison with correlation values in interference station detection section 308 can be changed adaptively according to channel quality, etc.

In mobile station apparatus A 102, data in which interference station information is multiplexed is subjected to predetermined modulation processing by modulation section 310, is spread with spreading code A by spreading section 311, and subjected to predetermined radio processing by transmitting RF section 312, and is then transmitted to base station apparatus 101 via duplexer 302 and antenna 301.

Then, in base station apparatus 101 shown in FIG. 2, a signal received via antenna 208 and duplexer 207 is subjected to predetermined radio processing by receiving RF section 209, is despread with spreading code A by despreading section 210, and is subjected to predetermined demodulation processing by demodulation section 211. The demodulated signal is output to separation section 212.

In separation section 212, the demodulated signal is separated into receive data and interference station information-that is, information indicating mobile station apparatus B 103. Information indicating mobile station apparatus B 103 is then output to control section 213.

In control section 213, the transmit data transmission power and transmission rate are controlled in accordance with the interference station information. That is to say, since the interference station can be determined from the interference station information to be mobile station apparatus B 103, control section 213 decreases the transmission power and lowers the transmission rate of transmit data for mobile station apparatus B 103 by controlling spreading section 204 and transmission power adjustment section 205. In other words, in a base station apparatus according to this embodiment, an interference station indicated by interference station information directly becomes a mobile station apparatus subject to a decrease in transmission power.

An example will now be given of how a decrease in transmission power and lowering of the transmission rate may actually be achieved. Namely, control section 213 gives a directive to spreading section 204 to make the spreading ratio for transmit data to mobile station apparatus B 103 twice that used in the previous transmission, and makes the transmission rate half that of the previous transmission. At the same time, control section 213 gives a directive to transmission power adjustment section 205 to make the amplification factor for transmit data to mobile station apparatus B 103 half that used in the previous transmission, and makes the transmission power half that of the previous transmission. In accordance with these directives, spreading section 204 spreads transmit data with a spreading code B spreading ratio twice that of the previous transmission, and transmission power adjustment section 205 sets the transmission power of transmit data spread with spreading code B to half that of the previous transmission.

By this means, the transmission power of transmit data for mobile station apparatus B 103, which is an interference station for mobile station apparatus A 102, decreases, and thus the amount of interference with respect to mobile station apparatus A 102 decreases directly.

A method can also be envisaged whereby transmission power only is decreased without lowering the transmission rate. However, abase station apparatus according to this embodiment is configured so that the transmission rate is lowered in proportion to the decrease in transmission power in order to maintain communication quality.

Figure 5:
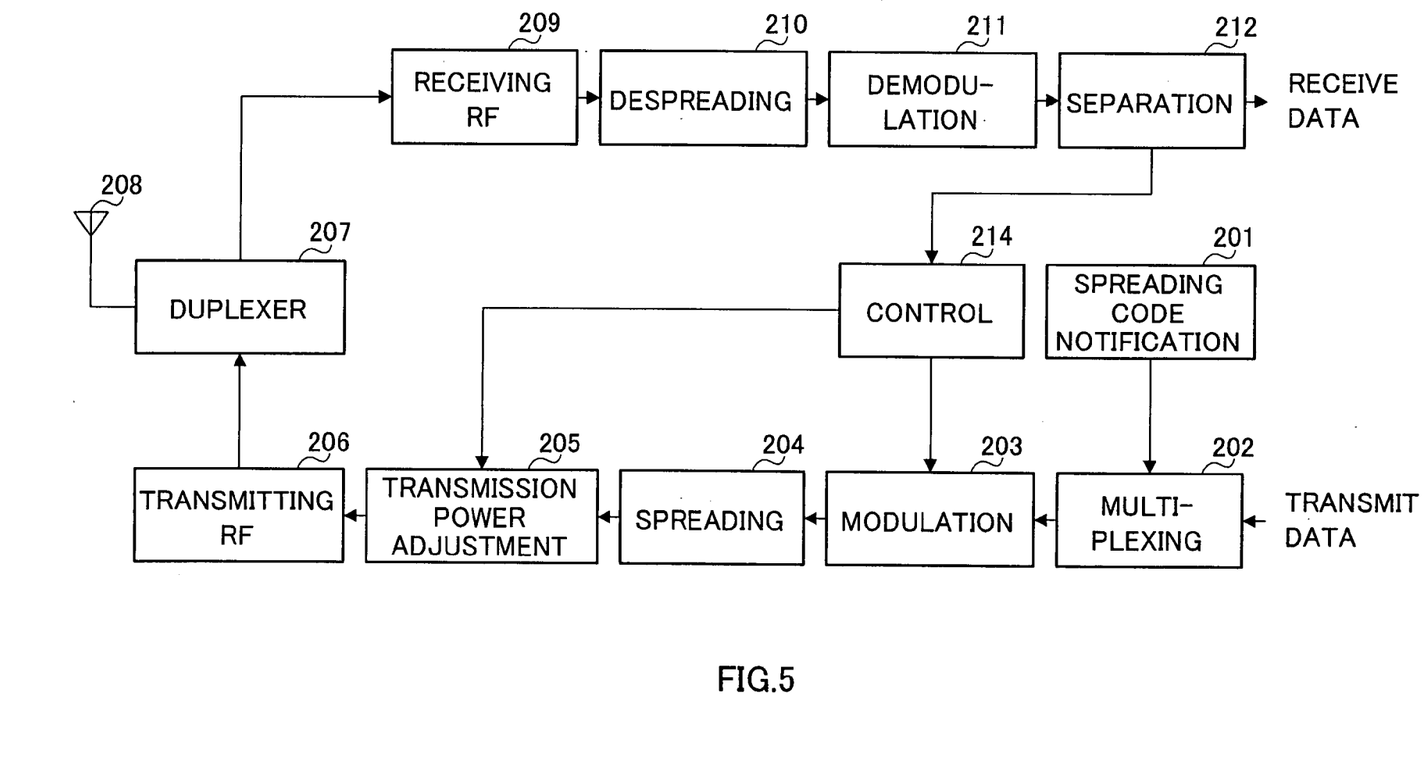
FIG. 5 is a main block diagram showing another schematic configuration of a base station apparatus according to Embodiment 1 of the present invention.

Also, in a base station apparatus according to this embodiment, a different method of decreasing transmission power can be used, whereby the transmission rate is lowered by decreasing the modulation M-ary value, and transmission power is decreased in proportion to the drop in the transmission rate. In this case, the base station apparatus configuration is as shown in FIG. 5. FIG. 5 is a main block diagram showing another schematic configuration of a base station apparatus according to Embodiment 1 of the present invention.

In FIG. 5, a control section 214 controls the modulation M-ary value and transmission power of transmit data in accordance with interference station information. That is to say, in correspondence with an interference station determined by means of interference station information, control section 214 decreases the modulation M-ary value and also the transmission power of transmit data for the interference station by controlling modulation section 203 and transmission power adjustment section 205.

Specifically, control section 214 may, for example, give a directive to spreading section 204 to make the modulation M-ary value for transmit data to an interference station half that used in the previous transmission, and make the transmission rate half that of the previous transmission. At the same time, control section 213 gives a directive to transmission power adjustment section 205 to lower the amplification factor by a predetermined amount compared with the previous transmission, in accordance with the amount of lowering of the transmission rate, for transmit data to the interference station, and decreases transmission power by a predetermined amount compared with the previous transmission. In accordance with these directives, modulation section 203 modulates transmit data for the interference station with the modulation M-ary value halved, so that modulation is performed using BPSK in the present transmission as compared with modulation using QPSK in the previous transmission, for example, and transmission power adjustment section 205 decreases the transmission power of transmit data for the interference station by a predetermined amount compared with the previous transmission.

Figure 6:
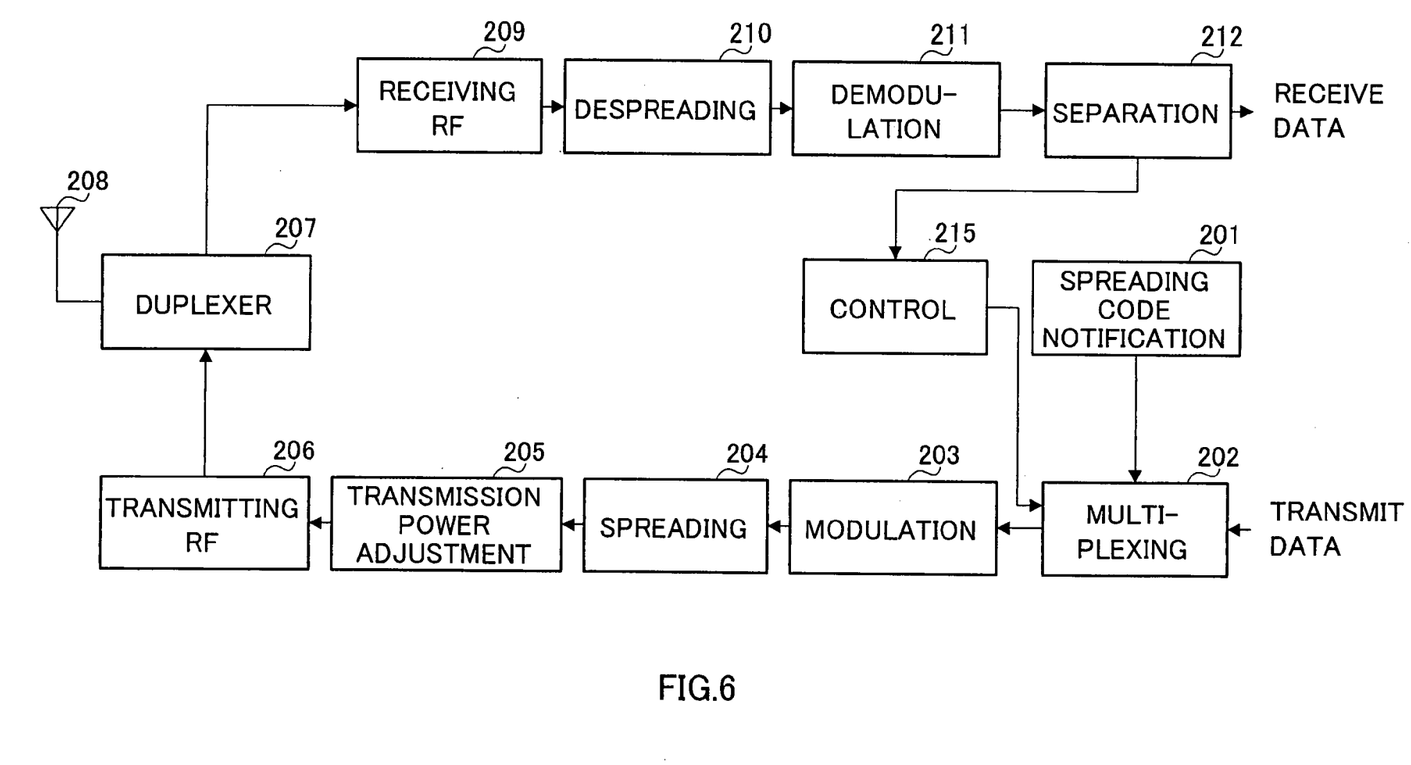
FIG. 6 is a main block diagram showing a schematic configuration of another base station apparatus according to Embodiment 1 of the present invention.

Also, in a base station apparatus according to this embodiment, a different method of decreasing transmission power can be used, whereby transmission power itself is not changed, but the transmission rate is lowered and average transmission power decreased by transmitting transmit data intermittently. In this case, the base station apparatus configuration is as shown in FIG. 6. FIG. 6 is a main block diagram showing the schematic configuration of another base station apparatus according to Embodiment 1 of the present invention.

In FIG. 6, a control section 215 controls the transmission interval of transmit data in accordance with interference station information. That is to say, in correspondence with an interference station determined by means of interference station information, control section 214 controls the transmission interval of transmit data for the interference station by controlling frame creation processing performed by multiplexing section 202. Specifically, in accordance with control by control section 215, multiplexing section 202 may, for example, store and output only the first half of a frame of transmit data for the interference station, or store and output only a predetermined slot within a frame.

By transmitting transmit data for an interference station intermittently in this way, although instantaneous transmission power does not decrease, average transmission power decreases due to the occurrence of intermittent portions. Also, since a signal that causes interference is not transmitted in the intermittent portions, there is no interference in the intermittent portions. Thus, the amount of interference decreases on average.

Various methods have heretofore been disclosed whereby an interference canceller is installed in a mobile station apparatus to cancel interference signals, but as the scale of interference canceller equipment is comparatively large, it is difficult in practice to install an interference canceller in a mobile station apparatus. However, according to this embodiment, the configuration of a mobile station apparatus is simple, as shown in FIG. 3, and therefore implementation of a mobile station apparatus according to this embodiment is quite possible in practical terms. Thus, a mobile station apparatus according to this embodiment may be said to be more suitable as a configuration for canceling interference signals than a mobile station apparatus equipped with an interference canceller.

Also, in this embodiment, a configuration may be used whereby the transmission power of transmit data for an interference station is not decreased, but transmission itself of data for an interference station is aborted.

Furthermore, in this embodiment, interference can also be canceled by applying the following kind of method. Namely, a control station apparatus ranking above base station apparatuses can cancel interference by performing processing that causes handover of an interference station from the cell or sector in which the interference station is currently located to an adjacent cell or sector.

Moreover, if a mobile station apparatus in the process of handover between cells or between sectors is detected as an interference station in one cell or sector, the control station apparatus ranking above base station apparatuses can cancel interference in that cell or sector by disconnecting the interference station channel in that cell or sector. When such processing is performed, the communication channel of a mobile station apparatus not detected as an interference station in the other cell or sector can be maintained in the other cell or sector.

In addition, a base station apparatus can cancel interference by transmitting signals with directivity formed for each mobile station apparatus. For example, a base station apparatus may vary transmitting antenna directivity, and form a null point in the direction in which a mobile station apparatus receiving major interference is located, so that an interference signal is not transmitted in that direction (null steering). Alternatively, the base station apparatus may transmit signals to mobile station apparatuses with sharp directivity formed (beam steering).

Also, in this embodiment, a configuration is used whereby a base station apparatus sends each mobile station apparatus information indicating a mobile station apparatus. However, in this embodiment, a configuration may also be used whereby information indicating mobile station apparatuses is not sent, but each mobile station apparatus finds correlation values with all spreading codes that can be considered to be assigned to other stations. When this configuration is used, however, the time required for interference station detection will be longer than with a configuration whereby information indicating mobile station apparatuses is sent.

Thus, according to a base station apparatus, mobile station apparatus, and transmission power control method of this embodiment, the amount of interference is not made relatively smaller by increasing the transmission power of a signal to a mobile station that receives interference, but the amount of interference is decreased directly by decreasing the transmission power of a transmit signal to a mobile station causing interference, thereby making it possible to prevent the amount of interference mutually imposed on mobile station apparatuses from increasing.

Therefore, according to a base station apparatus, mobile station apparatus, and transmission power control method of this embodiment, it is possible to prevent a decrease in the number of mobile station apparatuses that a base station apparatus can accommodate in its own cell, and to prevent a reduction in system capacity.

(Embodiment 2)

A base station apparatus according to Embodiment 2 of the present invention has almost the same configuration as a base station apparatus according to Embodiment 1, but differs in that, by comparing a plurality of interference station information, an interference station that imposes interference on a plurality of mobile station apparatuses is identified as a mobile station apparatus that has a major influence on a reduction in system capacity, and transmission power for that identified mobile station apparatus is decreased.

Figure 7:
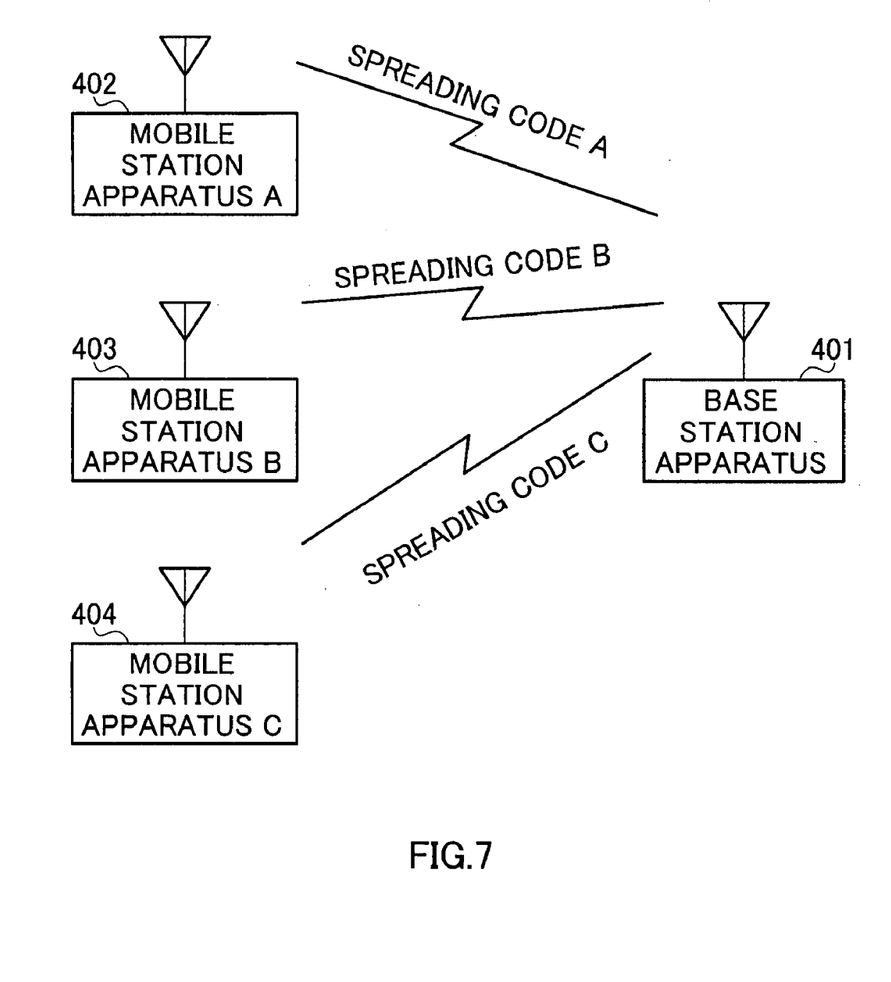
FIG. 7 is a conceptual diagram of a radio communication system in which a base station apparatus according to Embodiment 2 of the present invention carries out communication with mobile station apparatuses.

FIG. 7 is a conceptual diagram of a radio communication system in which a base station apparatus according to Embodiment 2 of the present invention carries out communication with mobile station apparatuses. In FIG. 7, a base station apparatus 401 is communicating with a mobile station apparatus A 402, a mobile station apparatus B 403, and a mobile station apparatus C 404.

A spreading code A is assigned to mobile station apparatus A 402, a spreading code B is assigned to mobile station apparatus B 403, and a spreading code C is assigned to mobile station apparatus C 404. That is to say, data transmitted and received between base station apparatus 401 and mobile station apparatus A 402 is spread with spreading code A, data transmitted and received between base station apparatus 401 and mobile station apparatus B 403 is spread with spreading code B, and data transmitted and received between base station apparatus 401 and mobile station apparatus C 404 is spread with spreading code C.

Figure 8:
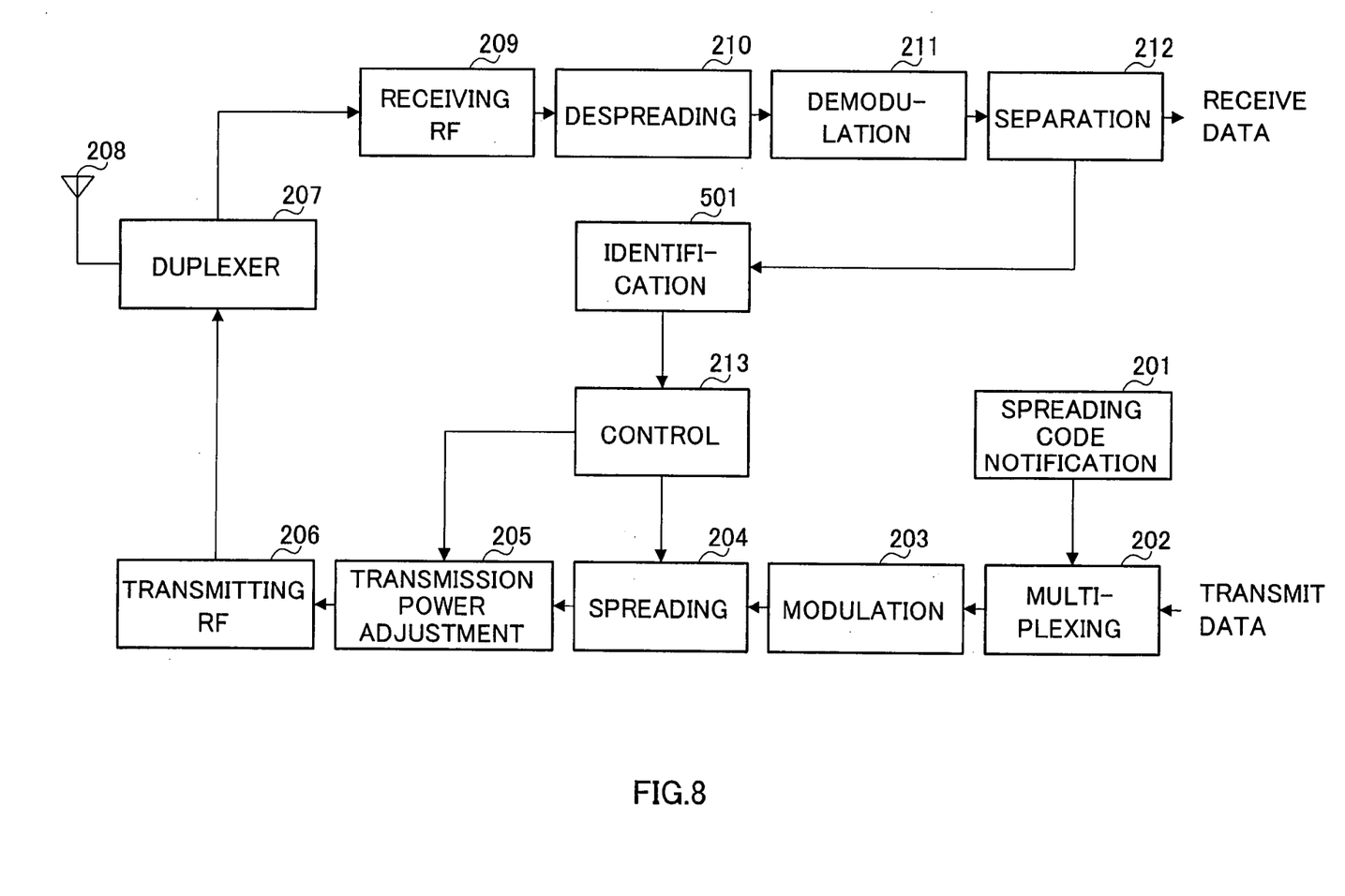
FIG. 8 is a main block diagram showing the configuration of a base station apparatus according to Embodiment 2 of the present invention.

The configuration of base station apparatus 401 will now be described. FIG. 8 is a main block diagram showing the configuration of a base station apparatus according to Embodiment 2 of the present invention. Parts in FIG. 8 identical to those in embodiment 1 are assigned the same codes as in Embodiment 1 and their detailed explanations are omitted. Also, the configuration of mobile station apparatus A 402, mobile station apparatus B 403, and mobile station apparatus C 404 is identical to the configuration shown in FIG. 3 of Embodiment 1, and therefore a description thereof will be omitted here.

In FIG. 8, an identification section 501 compares a plurality of interference station information, and thereby identifies a mobile station apparatus that has a major influence on a reduction in system capacity.

Figure 9A:
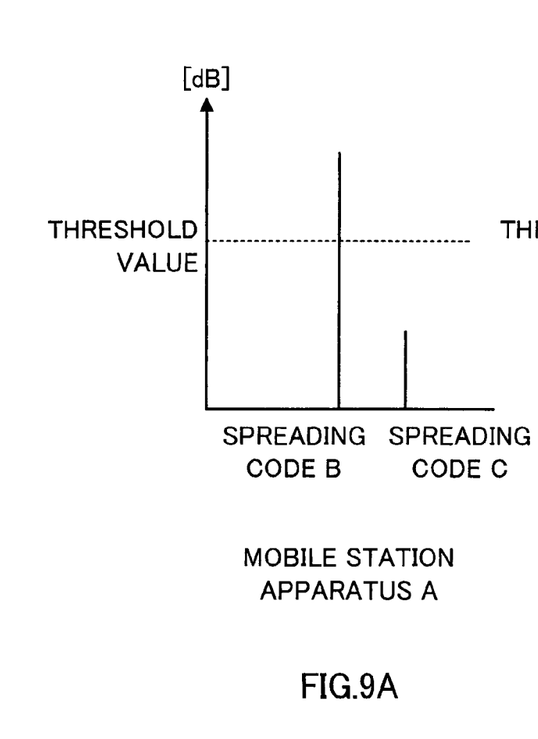
FIG. 9A is a drawing showing an example of the result of despreading by a mobile station apparatus according to Embodiment 2 of the present invention.
Figure 9B:
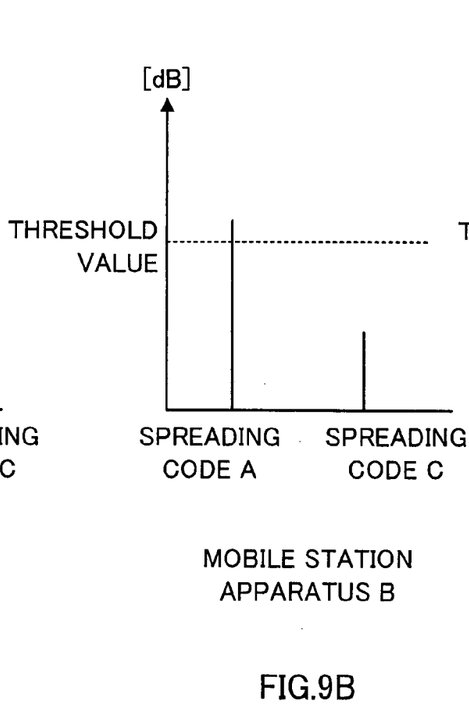
FIG. 9B is a drawing showing an example of the result of despreading by a mobile station apparatus according to Embodiment 2 of the present invention.
Figure 9C:
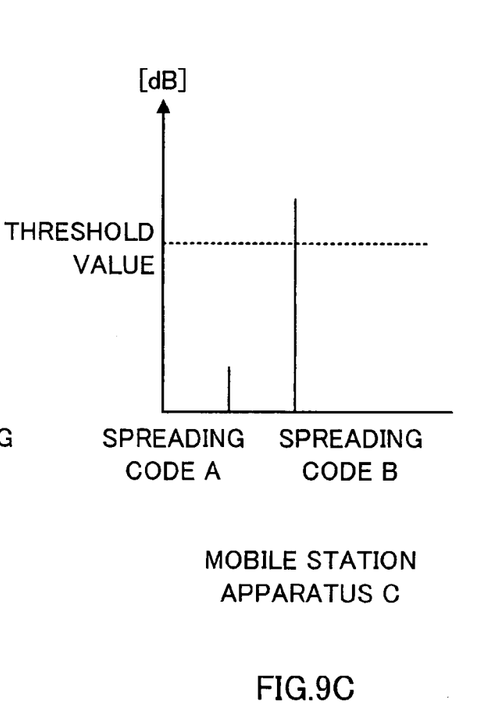
FIG. 9C is a drawing showing an example of the result of despreading by a mobile station apparatus according to Embodiment 2 of the present invention.

The results of despreading with other stations' spreading codes in each mobile station apparatus are as shown in FIG. 9A through FIG. 9C, respectively. FIG. 9A through FIG. 9C are drawings showing examples of the results of despreading by a mobile station apparatus according to Embodiment 2 of the present invention.

At this point, as shown in FIG. 9A, in mobile station apparatus A 402 the correlation value between the received signal and spreading code B is greater than a predetermined threshold value, and the correlation value between the received signal and spreading code C is smaller than the predetermined threshold value. Also, as shown in FIG. 9B, in mobile station apparatus B 403 the correlation value between the received signal and spreading code A is greater than the predetermined threshold value, and the correlation value between the received signal and spreading code C is smaller than the predetermined threshold value. Furthermore, as shown in FIG. 9C, in mobile station apparatus C 404 the correlation value between the received signal and spreading code A is smaller than the predetermined threshold value, and the correlation value between the received signal and spreading code B is greater than the predetermined threshold value.

Thus, information indicating mobile station apparatus B 403 from mobile station apparatus A 402, information indicating mobile station apparatus A 402 from mobile station apparatus B 403, and information indicating mobile station apparatus B 403 from mobile station apparatus C 404, is transmitted to base station apparatus 401 as respective interference station information.

In base station apparatus 401 shown in FIG. 8, interference station information separated by separation section 212 is output to identification section 501. In identification section 501, a mobile station that has a major influence on a reduction in system capacity is identified by comparing the interference station information transmitted from each mobile station apparatus. That is to say, in a base station apparatus according to this embodiment, an interference station indicated by interference station information does not directly become a mobile station apparatus subject to a decrease in transmission power.

Specifically, as information indicating mobile station apparatus B 403 is transmitted from mobile station apparatus A 402, information indicating mobile station apparatus A 402 is transmitted from mobile station apparatus B 403, and information indicating mobile station apparatus B 403 is transmitted from mobile station apparatus C 404, identification section 501 identifies mobile station apparatus B 403, which is imposing interference on the greatest number of mobile station apparatuses, as the mobile station apparatus that has the greatest influence on a reduction in system capacity.

Identification section 501 then outputs information indicating mobile station apparatus B 403 to control section 213, and in accordance with that information, control section 213 decreases the transmission power, and lowers the transmission rate, of transmit data for mobile station apparatus B 403.

Thus, according to a base station apparatus and transmission power control method of this embodiment, by comparing a plurality of interference station information, an interference station that imposes interference on a plurality of mobile station apparatuses is identified as a mobile station apparatus that has a major influence on a reduction in system capacity, and transmission power for that identified mobile station apparatus is decreased, thereby enabling interference to be canceled on a prioritized basis according to the degree of its influence on a reduction in system capacity, and enabling the efficiency of decreasing the amount of interference to be improved.

Moreover, according to a base station apparatus and transmission power control method of this embodiment, a mobile station apparatus for which transmission power should be decreased is identified based on a plurality of interference station information, thereby enabling a mobile station apparatus for which transmission power should be decreased to be identified with greater certainty, and so making it possible for the amount of interference to be decreased with greater dependability.

(Embodiment 3)

A base station apparatus according to Embodiment 3 of the present invention has almost the same configuration as a base station apparatus according to Embodiment 1 or Embodiment 2, but differs in that a mobile station apparatus for which transmission power should be decreased is identified after reconfirming with each mobile station apparatus whether or not it is acceptable for a mobile station apparatus for which transmission power should be decreased to be determined in accordance with interference station information sent from a particular mobile station apparatus.

Figure 10:
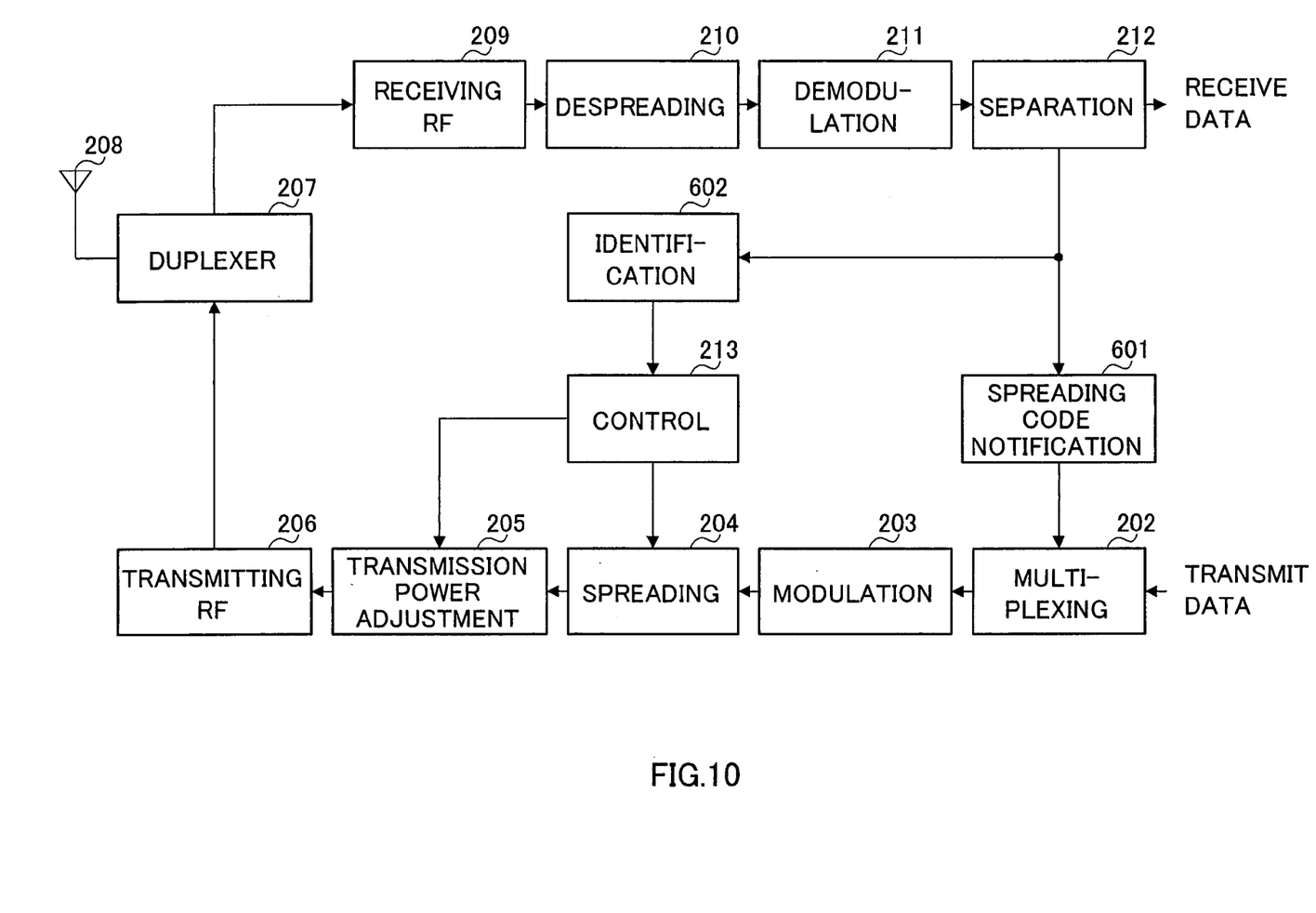
FIG. 10 is a main block diagram showing the configuration of a base station apparatus according to Embodiment 3 of the present invention.

FIG. 10 is a main block diagram showing the configuration of a base station apparatus according to Embodiment 3 of the present invention. Parts in FIG. 10 identical to those in Embodiment 2 are assigned the same codes as in Embodiment 2 and their detailed explanations are omitted.

In FIG. 10, a spreading code notification section 601, in addition to the operation described in Embodiment 1 and Embodiment 2, notifies each mobile station apparatus of the spreading code assigned to a mobile station apparatus indicated by interference station information output from separation section 212. An identification section 602 identifies a mobile station apparatus reported as an interference station a plurality of times as a mobile station apparatus for which transmission power should be decreased.

That is to say, in a base station apparatus according to this embodiment, it is reconfirmed with each mobile station apparatus by means of spreading code notification section 601 whether or not it is acceptable to identify a mobile station apparatus for which transmission power should be decreased in accordance with interference station information sent from a particular mobile station apparatus.

In each mobile station apparatus, detection of an interference station with respect to the mobile station is carried out again, and interference station information is again generated and transmitted to the base station apparatus.

In the base station apparatus, the re-sent interference station information is referenced by identification section 602, and a mobile station apparatus reported as an interference station a plurality of times from each mobile station apparatus is identified as a mobile station apparatus for which transmission power should be decreased.

Thus, according to a base station apparatus and transmission power control method of this embodiment, a mobile station apparatus for which transmission power should be decreased is identified after reconfirming with each mobile station apparatus whether or not it is acceptable for a mobile station apparatus for which transmission power should be decreased to be determined in accordance with interference station information sent from a particular mobile station apparatus, thereby making it possible to reduce the possibility of a mobile station apparatus for which transmission power should be decreased being identified based on incorrect interference station information. That is to say, according to a base station apparatus and transmission power control method of this embodiment, an interference station detected a plurality of times in each mobile station apparatus is identified as a mobile station apparatus for which transmission power should be decreased, thereby enabling a mobile station apparatus for which transmission power should be decreased to be identified based on more dependable information.

Also, according to a base station apparatus and transmission power control method of this embodiment, since a mobile station apparatus for which transmission power should be decreased is finally identified only after reconfirmation, a mobile station apparatus for which transmission power should be decreased can be identified based on more dependable information even in a case where, for example, there is a mobile station apparatus in a situation in which the result of spreading with the spreading code of another station fluctuates in the vicinity of the threshold value.

The invention of the present application can also be applied to an earlier invention relating to a transmission rate control method by the present inventors. This invention relating to a transmission rate control method compares permissible transmission power set in the radio resource layer and average transmission power found in the physical layer below the radio resource layer, and when the average transmission power is greater than the permissible transmission power, lowers the transmission rate in the media access layer, which is above the physical layer and below the radio resource layer. This invention is described in Unexamined Japanese Patent Publication No.12-049663, entire contents of which are expressly incorporated by reference herein. When the invention of the present application is applied to this invention, control is performed so as to decrease the permissible transmission power value for an interference station. Thus, the selectable transmission rate is of necessity lowered, and therefore transmission power for an interference station can be reduced.

As described above, according to the present invention appropriate transmission power control can be carried out so that system capacity is not reduced.

This application is based on Japanese Patent Application No.2000-157166 filed on May 26, 2000, entire contents of which are expressly incorporated by reference herein.

The invention claimed is:

1. A base station apparatus comprising:
a receiver that receives interference station information identifying an interference station that is a mobile station imposing interference on other mobile stations of a plurality of mobile stations that are currently communicating;
a transmitter that transmits a signal to each of the plurality of mobile stations; and
a controller that lowers the transmission rate of the signal transmitted to the identified interference station out of signals transmitted from the transmitter by reducing a modulation M-ary value of said signal transmitted to the identified interference station in accordance with the interference station information.

2. The base station apparatus according to claim 1, further comprising a notifier that provides information, indicating spreading codes assigned to the plurality of mobile stations, to the transmitter for transmission with the signals transmitted to the plurality of mobile stations.

3. The base station apparatus according to claim 1, wherein the controller decreases the transmission power of the signal transmitted to the interference station that imposes interference on a plurality of mobile stations.

4. The base station apparatus according to claim 1, wherein the controller decreases the transmission power of the signal transmitted to the interference station indicated a plurality of times by the interference station information received from the same mobile station.

5. A transmission power control method used in a mobile communication system having a plurality of mobile stations and a base station simultaneously communicating with the plurality of mobile stations, wherein:

a mobile station detects an interference station, which is another mobile station imposing interference on the mobile station, and transmits interference station information identifying the detected interference station to the base station; and the base station receives the interference station information and, lowers the transmission rate of the signal transmitted to the identified interference station out of signals transmitted from the base station to each of the plurality of mobile stations by reducing a modulation M-ary value of said signal transmitted to the identified interference station in accordance with the interference station information.

6. The base station apparatus of claim 1 wherein the interference station information is received from a mobile station other than the identified interference station.

7. The base station apparatus of claim 6 wherein the interference station information identifies a spreading code assigned to the communication signal that the base station apparatus transmits to the interference station.

8. The base station apparatus of claim 7 wherein the base station apparatus communicates spreading codes assigned to the plurality of mobile stations in each of the signals transmitted to the mobile stations.

9. The method of claim 5 wherein the interference station information identifies a spreading code assigned to a communication signal that the base station transmits to the interference station.

10. The method of claim 9 wherein the base station communicates spreading codes assigned to the plurality of mobile stations in each of the signals transmitted to the mobile stations.

11. The method claim 10 wherein the mobile station detects the interference station by despreading a received signal with each of the spreading codes received from the base station so as to determine which spreading code is most correlated with an interfering signal communicated by the base station.

* * * * *